United States Patent [19]

Laing et al.

[11] 3,720,198

[45] March 13, 1973

[54] HEAT STORAGE ELEMENTS, A METHOD FOR PRODUCING THEM AND DEVICES COMPRISING HEAT STORAGE ELEMENTS

[76] Inventors: Nikolaus Laing; Ingeborg Laing, both of Hofener Weg 35-37, 7141 Aldingen bei Stuttgart, Germany

[22] Filed: June 4, 1969

[21] Appl. No.: 830,457

[30] Foreign Application Priority Data

| | | |
|---|---|---|
| June 6, 1968 | Austria | A 5389/68 |
| June 6, 1968 | Austria | A 121/69 |
| June 6, 1968 | Austria | A 1068/69 |
| June 6, 1968 | Austria | A 1072/69 |
| June 6, 1968 | Austria | A 5389/68 |

[52] U.S. Cl. ................................................. 126/400
[51] Int. Cl. ................................................. F24h 7/00
[58] Field of Search ...... 126/400; 165/104, 105, 180, 165/6, 10

[56] References Cited

UNITED STATES PATENTS

| | | | |
|---|---|---|---|
| 1,894,775 | 1/1933 | Levenson | 126/400 UX |
| 2,640,478 | 6/1953 | Flournoy | 126/400 UX |
| 2,677,367 | 5/1954 | Telkes | 126/400 UX |
| 2,898,091 | 8/1959 | Verbeek | 126/400 UX |
| 2,915,397 | 12/1959 | Telkes | 126/400 X |
| 3,103,934 | 9/1963 | Sabourin | 126/400 X |
| 3,132,688 | 5/1964 | Nowak | 126/400 X |
| 3,463,161 | 8/1969 | Andrassy | 126/400 X |
| 3,536,058 | 10/1970 | Hearst | 126/400 X |

Primary Examiner—John J. Camby
Assistant Examiner—W. C. Anderson
Attorney—Pennie, Edmonds, Morton, Taylor and Adams

[57] ABSTRACT

A heat-storing element comprising a storage substance which can absorb latent heat, seed crystals distributed uniformly in said storage substance and a structure which prevents any change of the distribution during the melting phase of the substance.

16 Claims, 6 Drawing Figures

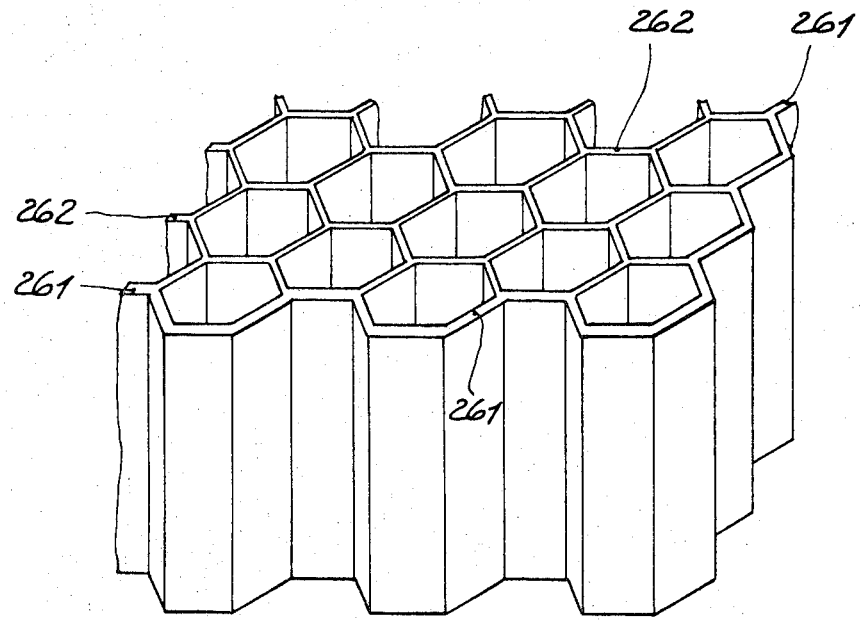
FIG. 5a
FIG. 5b
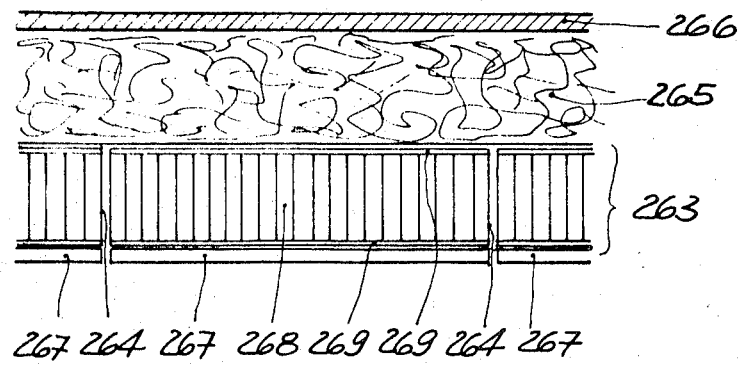

HEAT STORAGE ELEMENTS, A METHOD FOR PRODUCING THEM AND DEVICES COMPRISING HEAT STORAGE ELEMENTS

THE PRIOR ART

It is known to utilize the crystallization enthalpy of melts or solutions of crystalline materials for heat storage purposes. Storage substances are also known which reversibly absorb latent energy on recrystallization from one solid phase to another solid. The storage of laten heat utilizes the enthalpy which can be calculated from the product of entropy and the absolute temperature and which is equal to the difference of the internal energies between two or more phases through which a material successively passes. The entropy is maximum after the vapor phase in the liquid state of aggregation. All polymorphously convertible crystalline substances can therefore absorb in their various conversion stages only a part of the energy which can be absorbed when the storage substance is converted to the liquid phase by a further supply of heat. Although the conversion of the solid to the molten state is desirable thermodynamically, its practical application gives rise to such difficulties that heat storage devices of this type have hitherto hardly been used. The disadvantages of solid-liquid conversion are due to the fact that the storage substances must be enclosed in containers to prevent the substances escaping. Such containers must consist of a material which does not undergo any corrosion when the storage substances are in their liquid phase. Such containers are subjected to an extremely high mechanical load because on the transition from the crystalline state to the molten state the storage substances undergo considerable variations in density. If the stored heat is to be exchanged via a heat vehicle, e.g., a liquid or gas, heat exchangers are used which must be in satisfactory thermally conductive contact with the storage substance. The heat exchangers must also have thin walls, and this also gives rise to insoluble technological problems because of the extremely high forces occurring on the melting and solidification of the storage substance.

The economic problem is even greater, because in known storage devices, for example of the kind used as cold accumulators in refrigerated trucks, the tanks cost about 100 times the cost of the s storage substance.

The main disadvantage in the use of melting storage substances accommodated in such tanks, however, is that the properties of the storage substance vary over long periods.

It is well-known that all melting crystals have a definite melting point but that solidification on removal of the heat takes place at a temperature which is often very much lower. Thermodynamically it is desirable that the solidification temperature should coincide with the melting temperature in order to avoid making the operating temperature much higher than the required working temperature, since this would increase the heat losses considerably during the storage time.

It is well-known that this effect is achieved by adding seed crystals to the storage substance, the geometric (steric) structure of these crystals being so similar to the crystal shape of the storage substance that during the cooling process they initiate crystallization near the melting temperature and thus prevent the cooling that would be inevitable without such seeding.

Apart from the steric similarity seed crystals must have a melting point above the operating temperature of the storage device. These seed crystals thus remain in the solid state even when the storage substance melts. Since they have a different density, they migrate under gravity in the melt either in the upward direction or, in most cases, downwards. The storage substance containing seed crystals thus disintegrates increasingly so that the uniform distribution of the crystals in the storage substance required for seeding to take place without delay is lost. For example, if the seed crystals are deposited at the lowest point of the appliance, the heat is no longer yielded up at melting temperature, but at a lower temperature, so that the storage device cannot be used.

GENERAL DESCRIPTION OF THE INVENTION

The invention relates to heat storage elements whose thermodynamically active storage substance is melted on heating and which, as a result of uniformly distributed seed crystals, yields up the melting heat on cooling at approximately the same temperature, known as the melting temperature.

BRIEF DESCRIPTION OF THE DRAWINGS

FIG. 5a illustrates a honeycomb form used as a secondary structure in a storage element according to the invention; and FIG. 5b illustrates a floor heating structure utilizing the honeycomb form of FIG. 5a.

DETAILED DESCRIPTION OF THE INVENTION

Figure 1:
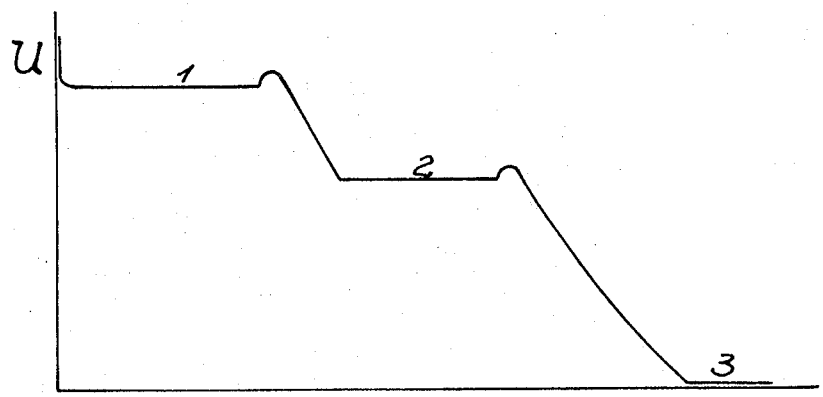
FIG. 1 is a graph showing the relationship between the reaction and the internal energy of a heat storage substance undergoing a number of conversions between solid and molten phases.

To prevent the melt from becoming impoverished in respect of seed crystals, the storage element according to the invention not only contains a storage substance and seed crystals but also a body which on the one hand retains the storage substance in the liquid phase like a sponge or a foam, while on the other hand it fixes the seed crystals in their uniform distribution.

According to the invention, the rigidity of the body is so selected as to be shape-retaining, so that tanks can be fully dispensed with. Thus with the invention it is possible to provide storage elements which, like the storage substance which makes use of polymorphy, are solids but which, unlike the polymorphous materials, enable all the enthalpy to be used for the storage process.

Storage substances have been described in which starch is added to the storage substance to prevent leakage losses in the event of leaky containers. This method is limited solely to a few hydrates and it has been found that the resulting thixotropic material separates within a few months. It has also been proposed to impregnate balsa wood with storage material in order to give shape retaining elements, but it has been found that although balsa wood can be impregnated with liquid storage substance, the seed crystals in solid form cannot penetrate the cell walls.

Suitable seed crystals are isotypical and epitaxial crystals provided they are not dissolved in the storage substance melt and do not themselves melt below the maximum operating temperature. Also suitable are isomorphous crystals if they are incorporated under the influence of high surface energy, for example in gaps having an extremely small opening angle. The capillary pressures are inversely proportional to the wall spacing. Increased pressures result in increased crystallization temperature so that penetration of the storage substance melt into fine gaps increases the melting point. If this melting point increase is beyond the maximum operating temperature, external crystals are unnecessary. According to the invention, therefore, there are added to the storage substance, substances which have extremely fine gaps and which form a plurality of capillary passages to provide a high capillary tension with the storage substance melt. It has been found that ground glass fibers statistically have gaps in a number and configuration such that they result in a considerable increase in the melting temperature of many storage substances. Such ground glass fibers can therefore be incorporated according to the invention in the body structure.

According to the invention, the preferred structure substances added are those which as a result of elongate crystals can form structures similar to the zeolites. Zeolites are crystalline substances which can absorb considerable quantities of foreign substances, e.g., water, in their very loose crystal lattice structure. Since the amount of substance required for the structure is insignificant (as little as 2.5 percent by weight is frequently sufficient), the storage enthalpy values of storage substances according to the invention which are interspersed with a body are hardly any different from those which are melted and recrystallized in a container. If the weight of the container wall is also taken into consideration, the storage elements according to the invention are much lighter. In particular, they are much cheaper and have none of the above disadvantages of the prior art storage devices, since in the liquid phase the synthetic zeolite as a solid holds the melt fast in its crystal lattice structure. Thus it is impossible for a hydrostatic pressure to form anywhere; the crystal lattice is not affected by the change of density as the material passes through the phases and finally stratification of the seed materials is impossible. If the storage substances in the molten state have a vapor pressure of the order of magnitude of water, evaporation must be prevented by a vapor barrier. According to the invention, this can be achieved by using plastics films or metal foils to enclose the body after the latter has been processed into the form of mouldings. Alternatively, the surface can be sealed and rendered vapor-impermeable by chemical covering layers. Particularly suitable layers of this type are those which consist of substances which react with a component in the air and thus pass over to a water-impermeable state only after application.

Particularly suitable substances for producing the body are those which have a fibrous crystal structure. These include fibrous or flocculent silicates, such as aerosil, tripotassium or dipotassium silicate, calcium aluminates, the ferrites of the light metals, flocculent soot, magnesium oxide, silicon oxide and other flocculent crystals of other oxides or salts.

It has been found advantageous according to the invention if the body is obtained by the use of crystal materials which are not soluble in the storage substance melt at operating temperature but are partly soluble at elevated temperature. To ensure that the storage substance is uniformly incorporated, the invention generally proposes that the body forming substance should be mixed with the ground storage substance in the solid state and be pressed after careful thorough mixing. After pressing, it has been found advantageous for heating to be carried out once in order to release these crystals, so that the structur-forming crystals interconnect in a sintering-like process. In the case of hydrates, this heating can frequently be carried out only under pressure, since otherwise water of crystallization would vaporize out. Heating should be carried out until a solid zeolite-like structure has formed after recooling. It has been found advantageous to increase the temperature until the solubility of the body-forming material is equal to about 30 percent. The amount of body-forming material depends on the nature of the storage substance and on its particle size in the solid state. It has been found that generally very small quantities of body-forming substance are required. For example, 97 percent of a eutectic salt of a number of light-metal nitrates and 3 percent magnesium oxide can be pressed to form storage substances which have a considerable strength even above the melting temperature of the eutectic. The seed crystals are also added to the material during production. The quantity by weight is unimportant; only the number of crystals is significant. If the latter are very small, quantities of 1–0.001 percent are sufficient. It is important that they should be uniformly distributed by mixing. After melting of the storage substance, the seed crystals remain uniformly distributed in the body and can no longer sink or rise. Given a suitable choice of the body substance, the latter can also form seed material for the storage substance, so that there is no need to add any further seed substance. Although the reason has not been clarified, the formation of the zeolitic structure evidently results in the formation of body substance hydrates so that according to the invention a small amount of water can be added to the storage substance during manufacture. Apart from the said metal oxides and double salts, according to the invention organic substances are also suitable for the production of bodies. A number of high-polymer synthetic resins are advantageous. If required, they are added with the addition of protective colloids to the hot melt. The melt is then emulsified at a temperature at which the substance for the body already melts and the melt is solidified as abruptly as possible to prevent any separation.

A suitable coating material to prevent vaporizing, for both inorganic and organic bodies, is a mixture of 5 percent extremely finely ground barite, 45 percent barium hydroxide and 50 percent water. The mouldings can be dipped into this mixture. During the actual drying process barium carbonate forms at a uniform layer thickness and is water-insoluble and vapor-impermeable. Any other coating substances which do not react with the storage substance and which pass over into water-insoluble substances by atmospheric oxygen or carbon dioxide are also suitable.

All salts, oxides and hydroxides are suitable as storage substances provided they have a high melt enthalpy. Salts having a covalent or ionic bond are therefore preferred. Very high enthalpy values are exhibited by hydrates, because of the hydrogen bridge bond, but they occur only in the region of relatively low temperatures. Since the required storage temperatures rarely coincide with the natural melting temperatures, the invention proposes eutectic melts, and if ternary and quaternary eutectics are included, a practically unlimited number of storage substances can be produced.

However, the invention is not confined to zeolite-like structure systems and organic foams, but can be embodied with other substances or structures provided that seed crystals can be incorporated which reliably prevent stratification and give a shape-retaining bodies. The invention therefore also uses element having a large residual volume, such as honeycomb shapes, glassfiber mats and open-pored hard foam materials. The actual storage substance is mixed with a gel-forming or thixotropic-rendering substance in the storage substance liquid phase and introduced into a plate, panel, sheet, or the like. The material of the latter takes all the tensile stresses and, where applicable, most of the pressure stresses, while the effect of the gel is to prevent the storage substance from escaping in the molten state. In this way it is possible to manufacture sheets, plates, panels, slabs or like elements having a very high mechanical strength. In the case of hard form materials or other solid elements, such as asbestos or felted paper, the seed crystal material is added to the body material during the actual manufacture according to the invention in order to prevent their being filtered off on subsequent introduction.

If the storage elements are protected from vaporizing out or from atmospheric humidity by films or foils, then according to the invention the latter can be made self-repairing in the event of any damage by adding to the storage substance a chemical, such as barium hydroxide octahydrate, for example, which converts to a water-insoluble substance in air.

In FIG. 1, the internal energy U of a storage substance for a storage material according to the invention is shown against the reaction ($t$). The level 1 corresponds to the internal energy of the solid. As far as level 2, this undergoes a polymorphous conversion, so that the difference between the level 2 and the level 1 can be taken as storage energy. Level 3 corresponds to the molten state and shows that the maximum energy difference is between level 2 and level 3. It will be apparent that the inclusion of the molten phase must in every case result in a greater enthalpy than just the utilization of the polymorphous conversions. This inclusion of the molten phase without the adverse stratification referred to hereinbefore, is the purpose of the invention.

Figure 2:
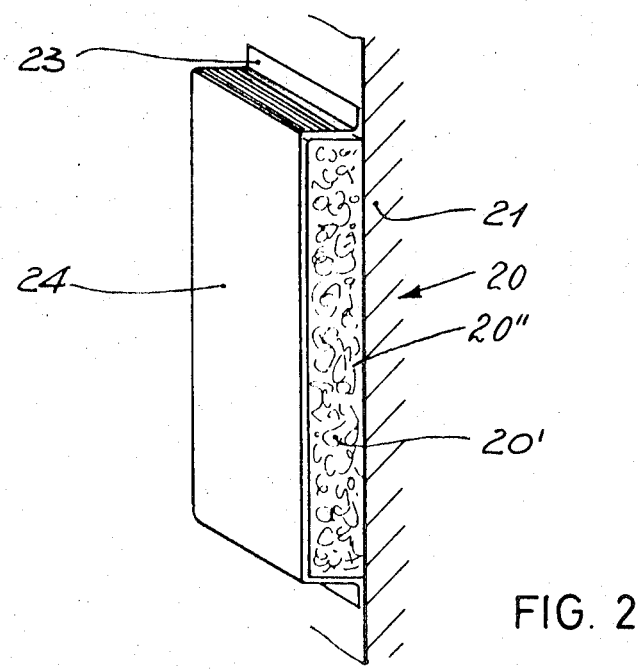
FIG. 2 is a diagrammatically prospective and partial section of a storage element constructed according to the invention.

FIG. 2 diagrammatically illustrates a storage element 20 comprising a storage material 20' and a shape retaining body 20''. The storage material as described previously may comprise a salt, for example a metallic salt, having high melt entholpy. The shape retaining body 20'' may comprise generally a sponge, foam or a zeolite type structure which is insoluable or substantially insoluable in the melted storage material at its operating temperature and which has therein a plurality of capillary passages. Isotypical or epitaxial seed crystals, not shown, of the type previously described are incorporated in the shape retaining body so that the seed crystals are in effect fixed in the storage element and cannot over a period of time migrate in the storage material when the storage material is in the molten phase.

The body member 20 being a sponge, foam or zeolite structure will maintain the molten storage material within the body due to capillary forces. Where the storage material used has a vapor pressure on the order of water, evaporation may be prevented by adding a vapor barrier, as for example film or sheet 24 which is also utilized to fix the storage element to a wall 21 as at 23.

Floor heating systems have been constructed in the form of electrical storage heaters which draw current at night and in which the heat storage is carried out by ceramic materials. These heating systems are unsatisfactory, because the temperature rises proportionally with the storage quantity, so that at times when a considerable amount of heat is required the morning temperatures are unacceptably high whereas the evening temperature — when there is the greatest heat requirement — has dropped greatly.

Instead of the storage elements for storing sensible heat, the invention uses latent-heat-storage materials as described above. Storage materials for this purpose are required to have critical temperatures of about 30°C. To this end, according to the invention, use is made of the hydrates of non-metallic metal compounds, e.g., the decahydrate of sodium sulphate or the dodecahydrate of disodium hydrogen phosphate. The container provided by the invention is preferably in the form of thin-walled plastics tubes. According to the invention, they are accommodated in elements which form the floor. Charging is via resistance heaters which are disposed inside the storage material but preferably between the tube filled with the storage material and the insulation situated thereon. A gas-filled tube may be provided at a suitable place to exert a positive pressure on the storage material in the gel state so that the storage material is pressed against the upwardly extending wall of the floor to ensure perfect thermal contact. Alternatively, according to the invention, the heat transfer can be reduced so that the heat yield is controlled by varying the pressure in a tube of this kind or else a hollow member is disposed between the floor-forming layer and the tube filled with the storage material, the gas filling of the tube being reducible until the layers bear completely on one another. The element according to the invention can be used in the same way as a wall or ceiling heating system.

Figure 3:
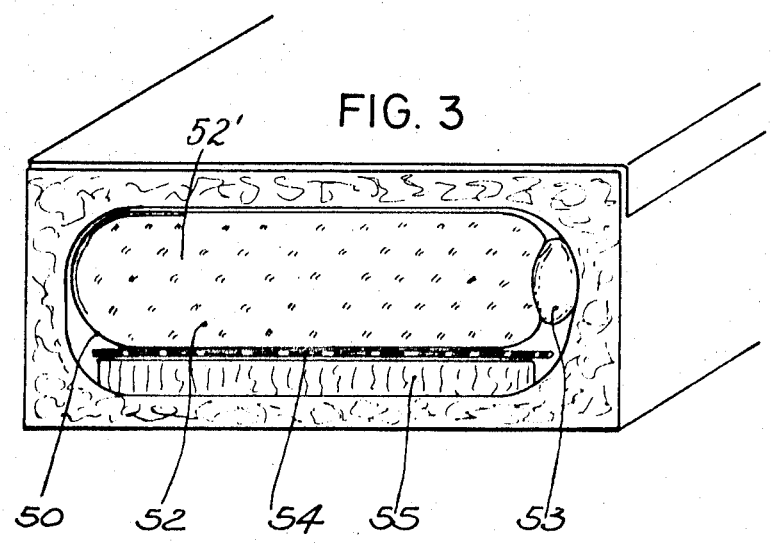
FIG. 3 is a prospective view and section of a floor panel constructed in the form of a hollow block, the interior of which contains a storage element according to the invention.

FIG. 3 illustrates a floor panel or the like made of concrete and in the form of a hollow block containing a plastic tube 50 having therein a storage element constructed according to the invention comprising a storage material 52 and a porous body element 52'. An air-filled tube 53 is included to act as a pneumatic spring element. A heater 54 constructed from two films, foils, sheets or the like having an electrical resistance layer interposed therein is provided to charge the storage material 52 during the night time. An insulating layer 55 provides a thermal installation with respect to a level situated below the floor panel.

Figure 4:
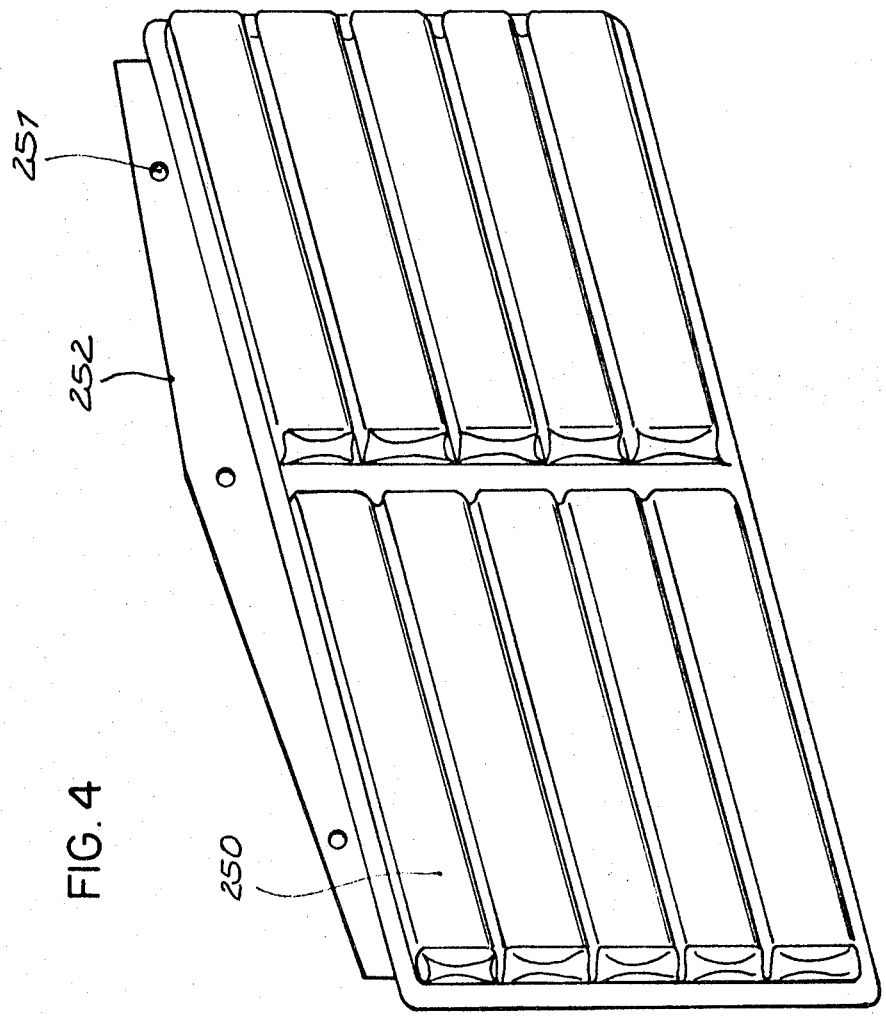
FIG. 4 illustrated a building panel or the like utilizing a plastic sheeting and enclosing a storage element according to the invention.

FIG. 4 illustrates a building panel utilizing heat storage elements constructed according to the invention where the elements are to be suspended from a wall. In this construction plastic sheets are joined together to form cavities 250 which contain the heat storage elements. As the building panels would have little stiffness or rigidity, eyelets 251 are provided in the structure 252 so that the panel may be hung from a wall. The plastic panels further serve as a vapor barrier to prevent escape of vapor when the heat storage substance is in the molten phase.

FIG. 5a illustrates a fragmentary corner of a secondary body structure which may be included in a heat storage element where the secondary structure is in the form of a honeycomb extruded number. The edge walls 261 of the element are reinforced with respect to the inner walls 262 so that mechanically rigid panel elements are formed from which complete floor heating surface elements can be assembled.

Referring to FIG. 5b there is illustrated a floor heater surface element 263 which comprises individual elements 264 with floor plaster 265 or the like thereabove over which a floor covering 266 is placed. Electrical heating elements 267 are disposed beneath the storage elements. As seen, each storage element 264 is constructed from a tubular secondary structure 268 along with cover plates or foils 269 which further serve to seal the storage material within the cells of the honeycomb structure.

We claim:

1. A storage element comprising a storage substance which can absorb heat on transition from the solid state to the liquid state having seed crystals in said substance to prevent the storage substance from cooling below its melting temperature during a phase in which it yields up heat, characterized in that a porous shape retaining body having therein a plurality of small capillary passages is included in said element to hold said crystals uniformally throughout said substance and to hold said substance by capillary tension within said element and a vapor barrier encasing said body to prevent escape of vapor of said storage substance from said element.

2. A storage element according to claim 1 characterized in that the storage substance comprises substantial eutectic multi-phase mixtures.

3. A storage element according to claim 1 characterized in that the shape retaining body comprises an inorganic substance having fibrous crystal structures.

4. A storage element according to claim 1 characterized in that the storage material is uniformally distributed in said shape retaining body and has in addition a secondary support means integrated therein.

5. A storage element according to claim 1 having in addition a plastic tube encasing said storage element.

6. A storage element according to claim 1 characterized in that said vapor barrier comprises an air-tight flexible covering.

7. A storage element according to claim 1 characterized in that the storage substance uniformly distributed in said body is incorporated in a further secondary body.

8. A storage element according to claim 1 characterized in that the porous body is made of ground glass fibers having fine gaps therebetween which have a high surface tension in relation to the storage substance in the liquid state.

9. A storage element according to claim 1, characterized in that the body comprises a porous material which, in the liquid phase of the storage substance in the range of operating temperatures, is insoluble or substantially insoluble, does not react chemically with the storage substance and, at the melting temperature of the storage substances is in the solid state.

10. A storage element according to claim 9, characterized in that said body is at least slightly soluble in the storage substance melt at a temperature above operating temperature.

11. A storage element according to claim 9 characterized in that said body comprises a synthetically formed zeolite-like structures and the storage substance is incorporated in said zeolite-like structures.

12. A storage element according to claim 1, characterized in that the storage substance comprises a metallic salt hydrate which melts in its own water of crystallization.

13. A storage element according to claim 12, characterized in that the storage substance comprises a double salt hydrate.

14. A storage element according to claim 1, characterized in that the body constitutes only a few per cent, preferably less than 3 percent, of the storage substance.

15. A storage element according to claim 1, characterized in that the secondary body comprises a sheet metal mat.

16. A storage element according to claim 15, characterized in that the secondary body comprises interlinked coils of metal whose diameter corresponds to the sheet thickness.

* * * * *